(12) United States Patent
Knapp

(10) Patent No.: US 7,861,757 B2
(45) Date of Patent: Jan. 4, 2011

(54) FLASHLESS WELDING METHOD AND APPARATUS

(75) Inventor: Mark Knapp, Ravenna, OH (US)

(73) Assignee: SpringSeal, Inc., Streetsboro, OH (US)

( * ) Notice: Subject to any disclaimer, the term of this patent is extended or adjusted under 35 U.S.C. 154(b) by 0 days.

(21) Appl. No.: 12/364,805

(22) Filed: Feb. 3, 2009

(65) Prior Publication Data
US 2009/0133841 A1 May 28, 2009

Related U.S. Application Data

(62) Division of application No. 11/347,142, filed on Feb. 3, 2006, now Pat. No. 7,503,992.

(51) Int. Cl.
*B32B 37/00* (2006.01)
(52) U.S. Cl. ...................... 156/499; 156/580
(58) Field of Classification Search ............. 156/82, 156/157, 228, 272.8, 304.1, 304.2, 304.6, 156/497, 499, 502, 580, 581, 583.1
See application file for complete search history.

(56) References Cited

U.S. PATENT DOCUMENTS

| | | | |
|---|---|---|---|
| 4,239,574 A * | 12/1980 | Aust et al. | 156/267 |
| 5,439,546 A | 8/1995 | Brickenstein | |
| 5,902,657 A | 5/1999 | Hanson et al. | |
| 6,056,033 A | 5/2000 | Schwaiger | |
| 6,068,038 A * | 5/2000 | Kawaura | 156/580 |
| 6,228,204 B1 * | 5/2001 | Reinhardt et al. | 156/304.2 |
| 7,122,088 B2 | 10/2006 | Field et al. | |
| 7,343,950 B2 | 3/2008 | Field et al. | |
| 7,503,992 B2 | 3/2009 | Knapp | |

* cited by examiner

*Primary Examiner*—James Sells
(74) *Attorney, Agent, or Firm*—Tarolli, Sundheim, Covell & Tummino LLP

(57) ABSTRACT

A method and apparatus for welding two separate ends of an extrusion or two separate extrusion ends to form a flashless extrudate or gasket by having a first and a second mold for supporting and clamping the extrusion ends, and a spacer bar for positioning the extrusion ends to a location within the mold. A heating element elevates the temperature of the extrusion ends to a welding condition, and a clamping device is used for securing the extrusion ends. A flashless welding operation results by inserting and clamping at least one heated extrusion end into a welding mold until an acceptable contact pressure is obtained against the opposing heated extrusion end.

7 Claims, 6 Drawing Sheets

FLASHLESS WELDING METHOD AND APPARATUS

CROSS-REFERENCES TO RELATED APPLICATIONS

The present application is a divisional application of application Ser. No. 11/347,142 filed on Feb. 3, 2006, entitled FLASHLESS WELDING METHOD AND APPARATUS, now U.S. Pat. No. 7,503,992. The present application claims priority to the above-identified patent application, which is incorporated in its entirety herein by reference for all purposes.

FIELD OF THE INVENTION

The present invention concerns both methods and apparatus relating to the welding of various materials together generally, and more specifically, it relates to the improvements in the welding process that results in a flashless connection between separate articles or opposite ends of a single article.

BACKGROUND ART

Several different methods of extruding thermal plastics are well known in the industry, including methods for both cold and hot feed extrusion. There is an infinite number of extrusion profiles that can be extruded depending on the shape and contour of the particular die used in the extrusion process. The four most common extrusion profiles are tubing, channel, cord and bulb seals.

Finished extruded material can be made into continuous rolls of varying length, generally referred to in the industry as extrudate. The length of the extrudate roll is typically specified from a customer's stock order. Alternatively, the finished extruded material can be formed to make individual parts that often resemble an endless loop or ring, typically referred to by those skilled in the art and hereinafter as a gasket, a continuous gasket, or an endless gasket. An endless gasket is formed by welding the opposite ends of a single piece of extruded material together. The end products whether originating form extrudate or an endless gasket can include residential weather seals, automotive weatherseals and gap fillers, major appliance seals, construction seals, architectural glazing seals, large diameter pipe seals, and various seals used in equipment or machinery.

During the manufacturing of an endless gasket, extruded material is frequently cut to length for a particular application and then welded together end-to-end to form an infinite number of shapes and sizes. The most common endless caskets form a rectangular or circular pattern.

It is not uncommon for a break to occur in the extrudate for any number of reasons, including fatigue or stress on the extrusion, depletion of raw materials making up the compound, machine break-down, or operator neglect during the manufacturing process. Since the extrudate is sent in rolls conforming to a customer's specified length, a splice is frequently needed in order to make the material, once again, continuous, which avoids the creation of scrap because the extrusion length is too short to fill the customer's order. A splice is also needed in the endless gasket product in order to connect two ends of a single extruded piece of material in order to form a continuous ring.

Therefore, a joining process is needed in order to unite opposite ends of a single article to make an endless gasket or to unite separate pieces of extruded material in order to form an extrudate. Heat is applied through a heating element during a welding operation at the extruded material ends. During the joining process a splice results between the ends of two separate extrusions or the two ends of the single extrusion. After the welding operation, the resulting splice can leave an undesirable seam or flash, which is not part of the finished product. This flash is particularly undesirable in extruded profiles that perform a sealing function. In addition, the flash generates extra cost to the product by requiring an additional deflashing operation, either manually by an operator or a mechanical trimming operation. As well, trimming the flash can propagate tears, which weakens the welded joint The cost associated with trimming and removing flash material from an extruded product can be significant because of the additional operations and/or labor. This cost can be compounded in scrap that is produced when the flash removal results in trimming important parts of the finished product through operator error or machine overshoot in mechanical trimming operations.

What is needed is an improved method and apparatus that allows for a strong flashless connection between separate ends of an extrusion to form an endless gasket product, or between separations in extruded material to form a continuous extrudate product.

SUMMARY

The present disclosure is directed to an improved system for forming a seamless weld between two ends of extruded material, typically thermal plastics, such as and including without limitation, Acrylonitrile-Butadiene-Styrene ("ABS"), Polyvinyl Chloride Plastic ("PVC"), Polystyrene, Polyolefinic materials such as polypropylene, and polyethylene, Thermoplastic Elastomers ("TPE") and other similarly structured composites. The ends are joined to form either an extrudate or endless gasket.

In one exemplary embodiment, first and second extrusion ends are equally spaced against a spacer bar then secured within a clamp and positioned within a corresponding mold. The spacer bar is then retracted, creating a void for the insertion of a heating element. After a prescribed temperature is reached, the heating element is removed and the first and second molds are pushed freely together, where the molds freely pass over the respective extrusion ends. Once the molds assume a facial contact position, one clamp advances one extrusion end to a mating position, contacting the opposing extrusion end, while the opposite clamp remains stationary having a secured hold on its corresponding extrusion end. After the extrusion ends are in a contacting position, the molds are closed on the still molten material at the weld joint or splice. This compression action either prevents the flash from forming or reforms the flash back into the body of the extrusion cross section. The tooling is then released in conjunction with the clamps moving to an open position for the removal of a now continuous flashless product.

The described process can also be used for attaching corner joints between extrusion ends. Similarly, the corner joints are securely formed in a flashless type connection, resulting in an endless gasket product.

In another exemplary embodiment, the first and second extrusion ends are no longer equally spaced about their respective molds. Instead, the spacer bar allows one of the ends to be offset, extending to a distance greater than the opposing extrusion relative to the face of the mold. The offset distance is controlled by the location of the spacer bar, which acts similar to a physical stop in a fixture. In this particular embodiment, the molds now perform the clamping function previously executed by a separate set of clamps. This is accomplished by keeping one of the clamping molds stationary, while the opposite clamping mold is a mobile mold capable of movement. Within the cavity of the mobile mold is the extrusion end having the greater offset, and at this point, the mold acts as a clamp and securely grips the offset extrusion end. The opposing stationary mold, although in contact with the second extrusion end forming a secure attachment, provides for movement of the second extrusion end.

The mobile mold is then advanced toward the stationary mold, plunging the offset end into the stationary mold making contact and adhering to the opposite extrusion end, while driving it back into the stationary mold. Just prior to the plunging operation the stationary mold was preheated and continues to be heated until the extrusion ends are in contact. After extrusion contact, the stationary mold is cooled, thereby improving both the weld strength and appearance while eliminating flash. The molds are then opened for the removal of a now continuous flashless product In another embodiment, the heating element and spacer bar are combined. This eliminates a processing step and associated manufacturing costs.

In another exemplarily embodiment, a heater mold is located to a proximal side of a clamping mold. The heater mold coacts with a stationary clamping mold for receiving the opposing extrusion end and aids in forming a strong flashless seam between the two ends. The heater mold similarly clamps the two extrusion ends together after contact and is designed to cool in order to enhance the integrity of the connection between the two ends. The heater mold provides more control over the thermal processing of the extruded material by regulating the heating and cooling rates after the extrusion ends are joined. In addition, the heater mold reduces the fluctuation in temperature as the extrusion ends transition to a joining position, thus increasing the strength and seamless appearance in the connection.

Another aspect or feature associated with the use of a heater mold is the elimination of a thermal swelling phenomena that occurs after an extrusion is heated and cooled. It is not unusual for the resulting extrusion to grow because of swelling that occurs from the heating and cooling of the material inside the molds. By under sizing the heater mold cavity to a percentage less than the extrusion's desired cross-sectional area, allows the extruded material to retain the desired specification size typically in existence prior to heating.

In another exemplarily embodiment, a heater mold is located symmetrically about both clamping molds. After each respective extrusion end is loaded into the clamping molds, the heater mold remains spatially located from the extrusion ends at a prescribed distance. The distance being a value that still allows for free movement of the extrusion ends, but provides a position for efficient heat placement. After the heater mold is heated, or alternatively, hot air is directed into the mold between the two extrusion ends, the extrusion ends begin to melt. Both clamp molds are capable of movement and at this point advance the extrusions in concert until contact occurs. The heater mold is then cooled and the molds are then opened for the removal of a now continuous flashless product.

Another aspect of an exemplary embodiment includes the heating of the extrusion ends by utilizing heater bar sleeves, which encompass the joining sections of the extrusion ends. The heating sleeves are slightly offset from the extrusion profile and heat the extruded material along a portion of the extrusion ends. Each sleeve is oversized but follows the profile of the extrusion ends and are spaced to a controlled distance for optimizing the heating process. The heater bar sleeves can be used alone or in combination with a heater bar.

After the extrusion ends reach a prescribed temperature, the sleeves are retracted and the extrusion ends are advanced into a heating mold until joining contact is achieved. The heater mold is then cooled and the molds are then opened for the removal of a now continuous flashless product.

These and other advantages and features of the exemplary embodiments of the invention are described in detail in conjunction with the accompanying drawings.

DETAILED DESCRIPTION

Figure 1A:
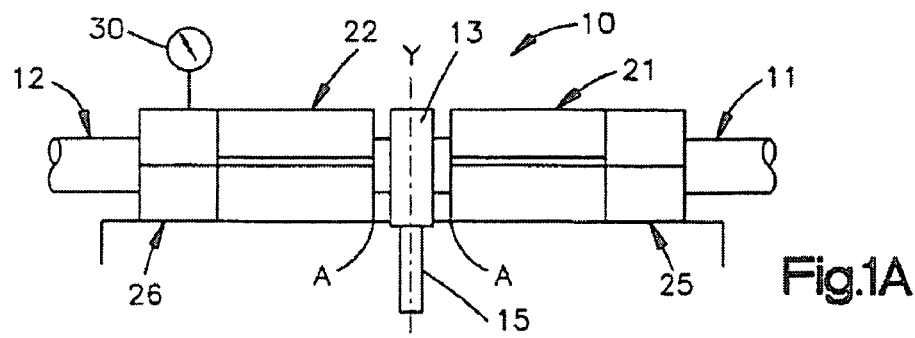
FIG. 1A is an elevation view of the welding system of a first embodiment in an extrusion end loading position.

FIG. 1A is a schematic depiction of an extrusion welding system 10 having a first and a second extrusion end, 11 and 12, respectively placed in a loading position. The extrusions represent the ends of two articles or the opposite ends of a single article. The extrusion may include a gasket having thermal plastic properties requiring a connection to form an endless flashless product. Alternatively, the extrusions may connect two separate extrusions together to form a finished product having separate opposite ends, or include forming an extrudate that requires a connection between two separate extrusions to form a continuous roll stock.

The welding system is capable of seamlessly welding extrusion compositions typically classified as thermal plastic material, such as and including without limitation, Acrylonitrile-Butadiene-Styrene ("ABS"), Polyvinyl Chloride Plastic ("PVC"), Polystyrene, Polyolefinic materials such as polypropylene, and polyethylene, Thermoplastic Elastomers ("TPE") and other similarly structured composites, but could also include any other material or compound having similar chemical properties. The welding system is also capable of seamlessly welding an unlimited number of geometrical profiles by designing the extruded material's profile into the welding system molds (mold adaptation), however the extrusion will be represented in the following Figures as being cylindrical for simplicity.

Figure 1B:
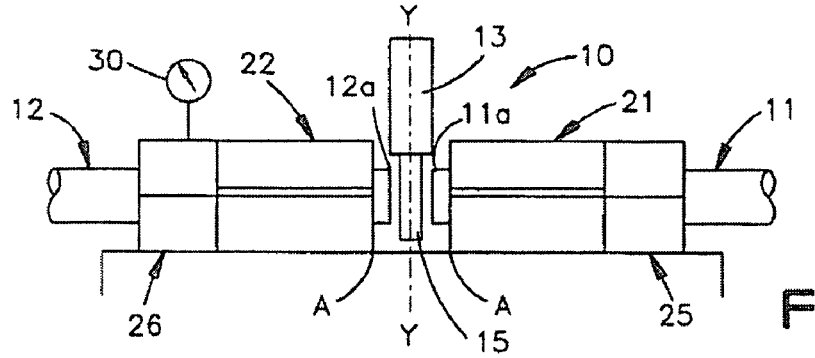
FIG. 1B is an elevation view of the welding system of FIG. 1A in a heating position.

FIGS. 1A-1D depict a preferred embodiment having pair of extrusion molds 21 and 22, substantially symmetrically located about an imaginary vertical axis depicted as Y-Y. The placement of the first and second extrusion ends are to a point of contact with a spacer bar 13, which acts as a physical stop for the extrusion ends at their joining ends represented by 11a and 12a, as best seen in FIG. 1B. At this point, the molds 21 and 22 are not completely closed over the extrusions, but instead comprise a gap of approximately 0.030" with their corresponding extrusion end.

After the extrusion ends are positioned, a static clamp 25 and moveable or mobile clamp 26 are closed securing the extrusion ends to a fixed first position "A", as shown in FIGS. 1A and 1B. The spacer bar 13 is then retracted creating a void for the insertion of a heating element 15, as shown in FIG. 1B. The heating element can be a number of different devices known by those skilled in the art of extruding materials. Some heating element examples can include, laser heaters, thermal electric resistive heaters, and hot air or gas heaters.

Figure 1C:
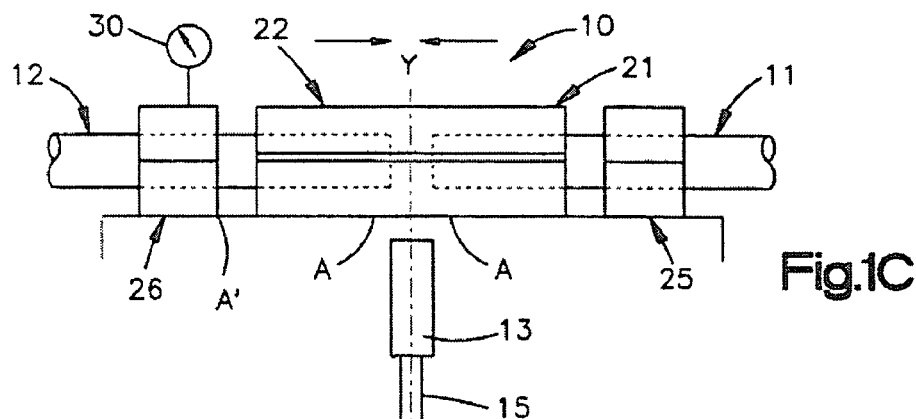
FIG. 1C is an elevation view of the welding system of FIG. 1A in a clamping position.

Although FIG. 1B depicts some distance between the first and second extrusion ends and heating element 15, depending on the material and heat requirements it is possible that the extruded material is capable of being in direct contact with the heating element. After an appropriate melting temperature is reached, having an approximate range between 150-300 degrees centigrade for a typical thermal plastic, the heating element 15 is removed and the molds are advanced to a second facial contact position, freely passing over the extrusion in close proximity as shown in FIG. 1C.

Figure 1D:
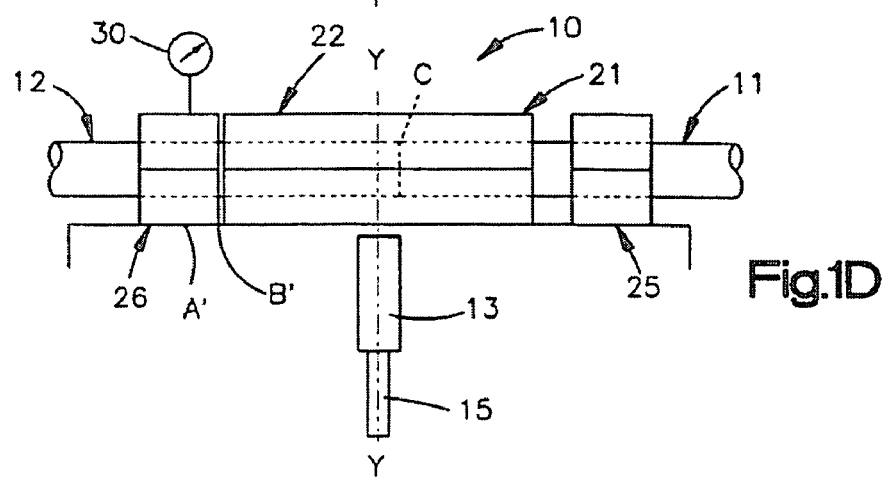
FIG. 1D is an elevation view of the welding system of FIG. 1A in a welding position.

FIG. 1D depicts the joining process where the first and second extrusion ends become welded together to form a continuous flashless connection. Joining of the extrusion ends is achieved by advancing the moveable clamp 26 from a first position "A'" shown in FIG. 1C to a second position directed toward the second mold 22 as depicted in FIG. 1D. Prior to physical contact between the moveable clamp 26 and mold 22, a acceptable resistance pressure 30 is attained, indicating that the contact pressure between the first and second extrusion joining ends are at level for forming a connecting weld between the two extrusions shown at point "C" in FIG. 1D. An acceptable pressure 30 is one that allows sufficient contact for welding thermal plastics. Such pressure is determined by adjusting the pressure applied to the clamps until an adequate bond is achieved. This pressure is therefore, empirically determined. Once the acceptable resistance pressure 30 is attained, the advancement of the moveable clamp 26 stops (represented by position "B'" in FIG. 1D) leaving a slight gap between mold 22 and moveable clamp 26. Molds 21 and 22 are then closed, forming a clamping connection between the two heated extrusion ends. The resistance pressure 30 can be measured by a number of different devices recognizable to those skilled in the art, such as pressure transducers, strain gauges, and linear variable displacement transducers ("LVDT").

After the first and second molds cool to a predetermined temperature, typically ranging from 60 to 80 degrees centigrade for most thermal plastics, the molds are opened and the continuous flashless extrusion is cured for removal.

Figure 2A:
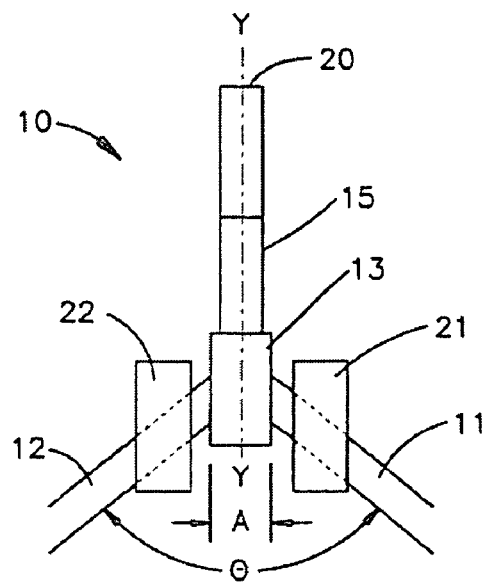
FIG. 2A is an elevation view of the welding system of a second embodiment for making a corner weld with the extrusion ends being presented in a loading position.
Figure 2B:
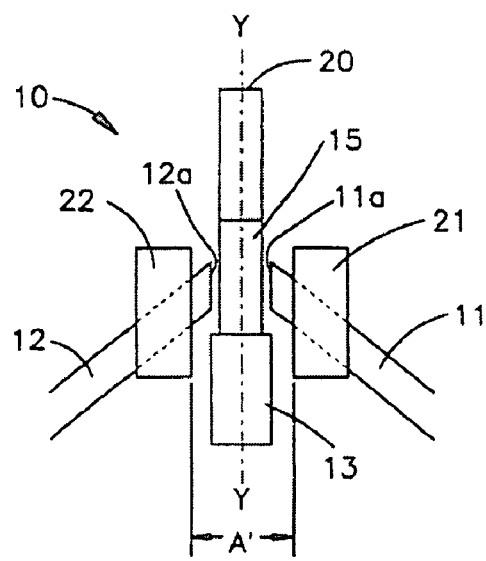
FIG. 2B is an elevation view of the corner welding system of FIG. 2A with the extrusion ends in a heating position.
Figure 2C:
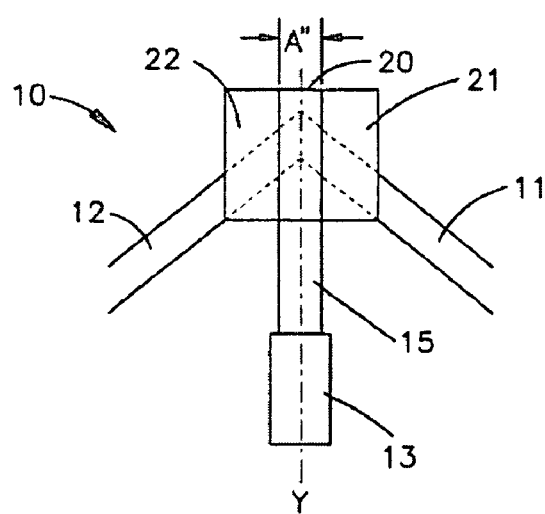
FIG. 2C is an elevation view of the corner welding system of FIG. 2A with the extrusion ends in a welding position.

Referring now to FIGS. 2A-2C is a separate preferred exemplary embodiment representing the above describe flashless welding technique for joining a first and a second extrusion end 11 and 12 in a corner connection. A corner connection is desirable in applications requiring a seamless connection at a prescribed nonlinear angle represented by "θ". One of the most popular applications is for window molding or gasket where θ is equal to 90 degrees. However, it should be understood by those skilled in the art that θ can be at any angle.

Returning to FIG. 2A, the first and second extrusion ends are supported by molds 21 and 22, and are in contact with a spacer bar or stop 13 at a specified first distance "A". The molds are at a first position "A'" that is substantially symmetrical about an imaginary axis represented by Y-Y. Once the extrusions are positioned against the spacer bar 13, the bar is retracted allowing for the advancement of a heating element 15 between the first and second extrusion ends, 11 and 12, as shown in FIG. 2B.

After the heating element elevates the temperature of the extrusion to a melting temperature, typically ranging between 150-300 degrees centigrade for most thermal plastics, the heating element is removed. Shortly thereafter, the molds are advanced to position "A''" in close proximity to the first 11 and second 12 extrusion ends that are also advanced by clamps (not shown) to a point of contact as depicted in FIG. 2C. In concert with the aforementioned mold movement is advancement of a heating mold 20, which is moved forward until achieving a close proximity with the joining ends 11a and 12a of the extrusions. After an acceptable resistance pressure is obtained, the advancement of the extrusions and molds stop, allowing the molds to cool. After the prescribed cooling temperature is reached, the molds and clamps are opened allowing the continuous flashless corner mold to be removed. The combination of plunging, clamping, and cooling the molten extrusion material together prevents a flash from forming on the extrusion, and/or forces any excess material to be formed back into the body of the extrusion.

Another preferred exemplary embodiment is shown in FIGS. 3A-3D. In this embodiment, the extrusion ends 11 and 12 are no longer located symmetrically about the vertical axis Y-Y. Additionally, the first and second molds 21 and 22 are clamping molds replacing the need for separate clamping apparatus.

Figure 3A:
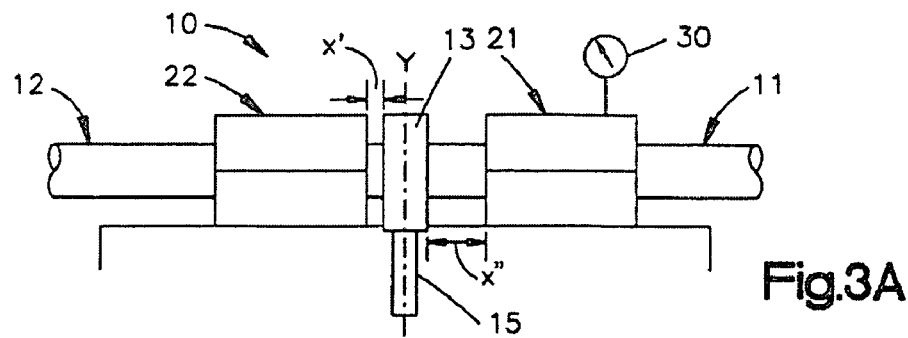
FIG. 3A is an elevation view of the welding system showing a third embodiment with the extrusion ends loaded and spaced in an offset position.

Spacer bar 13 locates the first 11 and second 12 extrusions at an offset distance "X'" and "X''" respectively, as depicted in FIG. 3A. The offset distances vary based on material type and size, however, for a ½ of an inch diameter extrusion, distances X' and X'' provided a sufficiently strong welded connection at distances ¼ and ½ of an inch, respectively. For most thermal plastic materials, the heating element 15 should be thermally elevated in order to bring the extruded material to a melting temperature, approximately ranging between 150-300 degrees centigrade, varying only the duration of exposure based on the size of the extrusions. It should be understood by those skilled in the art that the greater the size or surface area of the extrusion ends, the greater the heating exposure duration.

Figure 3B:
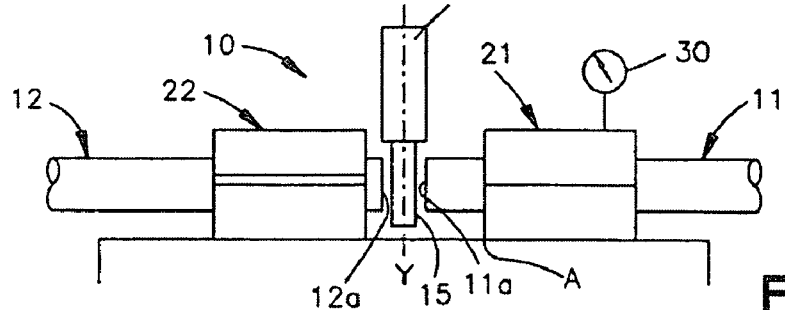
FIG. 3B is an elevation view of the welding system of FIG. 3A with extrusion ends in a heating position.

Referring now to FIG. 3B, once the offset locations of the extrusion ends are positioned, the spacer bar 13 is retracted Mold 21 now clamps its respective extrusion end, while the second mold 22 remains in close proximity to the second extrusion end leaving a 0.030" therebetween for free movement over the second extrusion end 12. The heating element 15 is then positioned between the extrusion ends for thermal processing.

After a prescribed temperature is achieved at joining ends 11a and 12a, the heating element is removed and clamping mold 21 is advanced from position "A" in FIG. 3B, thereby plunging the first extrusion end 11 into the second stationary mold 22. The advancement of first clamping mold 21 ceases once the prescribed resistance pressure 30 is attained, which is represented by position "A'" in FIG. 3C. The acceptable resistance pressure indicates that the contact between the first 11a and second 12a extrusion joining ends is at a level for a connecting weld represented by splice point "C" in FIG. 3C. Stationary mold 22 now clamps the corresponding extrusion ends for a duration that allows the extrusion ends to cool to a temperature below a softening point of the material, which is typically around 65 degrees centigrade for most thermal plastics. The plunging of the molten extrusion end into the opposing mold along with the continued compression resulting from the clamping until a cooling temperature is reached prevents any flash from forming and/or reforms any potential flash material back into the body of the extrusion, thus enhancing both the integrity and seamless appearance of the welded connection.

Figure 3C:
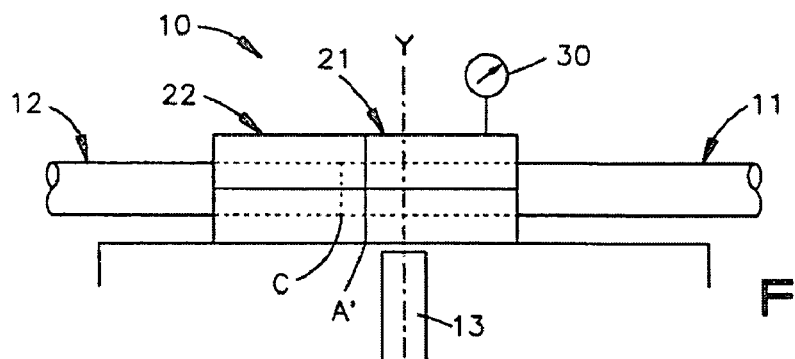
FIG. 3C is an elevation view of the welding system of FIG. 3A with the extrusion ends in a welding position.
Figure 3D:
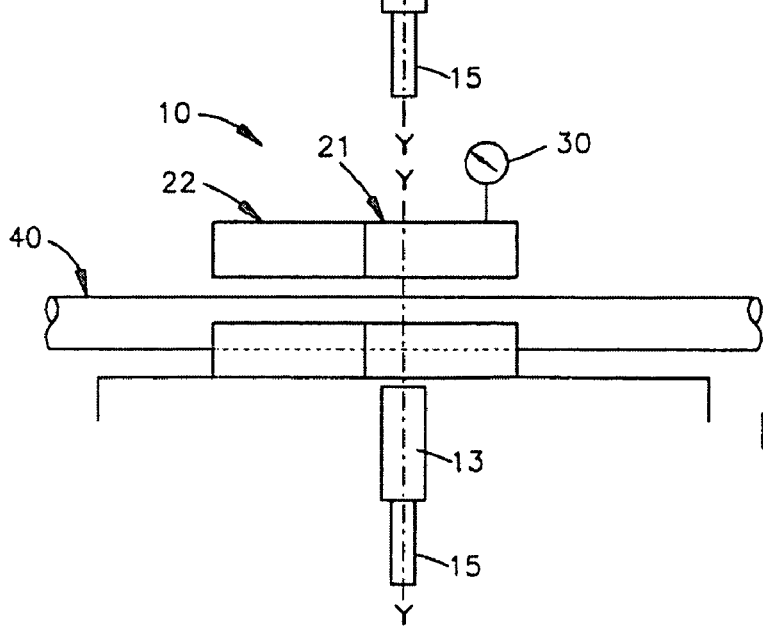
FIG. 3D is an elevation view of the welding system of FIG. 3A with the molds positioned in an extrusion unloading position.

After the joining process of FIG. 3C, a continuous flashless extrudate or endless gasket 40 is considered cured and ready for removal. As such, molds 21 and 22 are raised allowing the ejection of the single piece flashless extrusion 40 as shown in FIG. 3D. After removal the process returns to the operation described and shown in FIG. 3A.

Figure 4A:
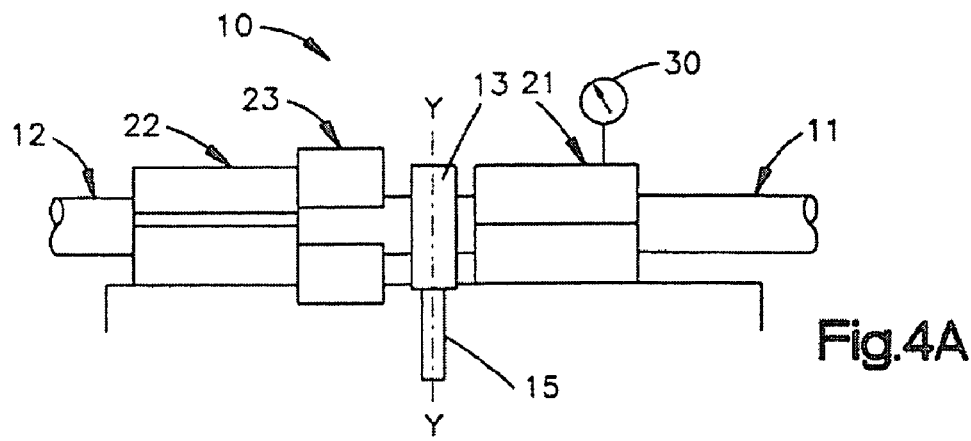
FIG. 4A is an elevation view of the welding system showing a fourth embodiment comprising a separate heater mold.
Figure 4B:
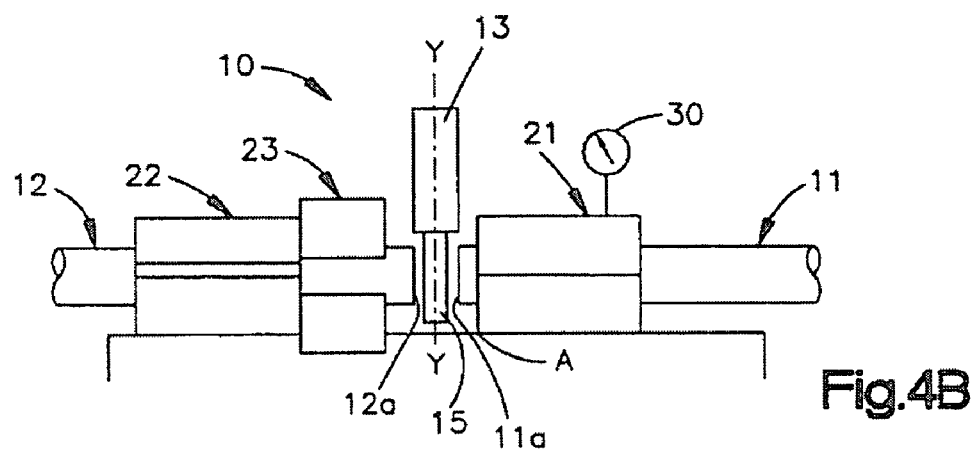
FIG. 4B is an elevation view of the welding system of FIG. 4A with the extrusion ends in a heating position.
Figure 4C:
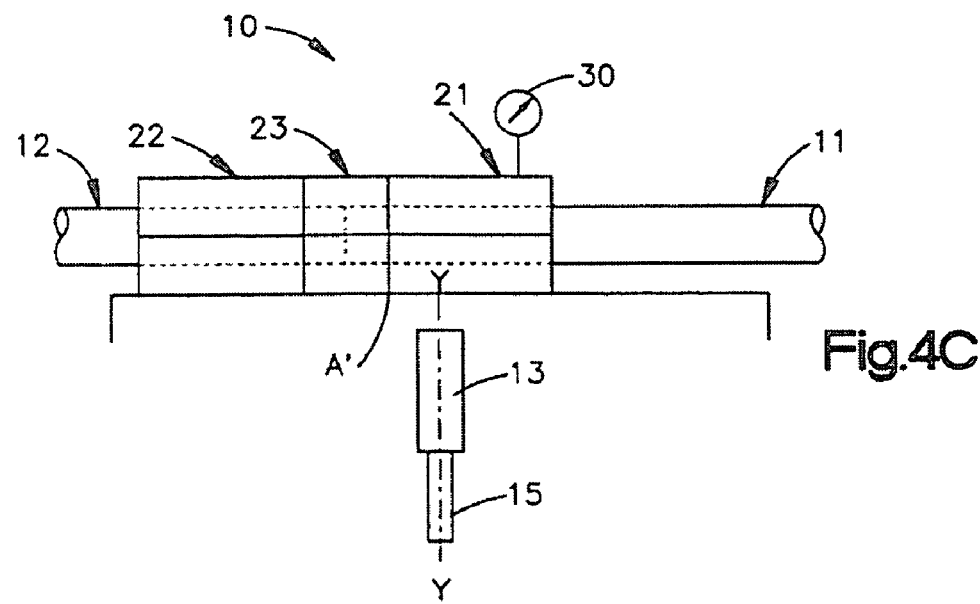
FIG. 4C is an elevation view of the welding system of FIG. 4A with the extrusion ends in a welding position.

Referring now to FIGS. 4A-4C is a preferred embodiment having a separate heater block mold 23 located to a proximal side 22a of stationary mold 22. A first 11 and a second 12 extrusion end are loaded in the molds 21, 22, and 23 and are similarly spaced about spacer bar 13 in either a symmetrical or offset position. Moveable mold 21 then securely clamps first extrusion 11. The spacer bar 13 is then retracted allowing the insertion of heating element 15, which thermally conditions extrusion joining ends 11a and 12a for the requisite duration, while the heater block mold preheats to a temperature approximately ranging between 150-300 centigrade for a typical thermal plastic material.

After the designed temperature is reached, the heating element is removed and the moveable mold 21 advances from position "A" in FIG. 4B, plunging the first extrusion 11 into stationary mold 22 until the prescribed contact pressure 30 with the second extrusion 12 is reached. FIG. 4C represents achieving the prescribed contact pressure 30 as occurring at position "A'". The heater mold 23 and stationary mold 22 then clamp the extrusion ends. The heater mold was preheated to predetermined temperature prior to the plunging operation. The temperature in the heater mold, for example should be elevated to approximately 200 degrees centigrade for a typical thermal plastic material. The incorporation of the heater mold provides more control over the thermal processing of the extruded material during the welding operation by regulating the heating and cooling rates before and after the extrusion ends are joined. In addition, the heater mold reduces fluctuation in temperature as the extrusion ends transition to a joining position, thus increasing the strength and seamless appearance in between the extrusion ends. Further advantages are obtained by using a heater mold, such as the elimination of a thermal swelling phenomena that occurs after an extrusion is heated and cooled. It is not unusual for the size of the resulting extrusion to grow because of swelling, which occurs from the heating and cooling of the material inside the molds.

Under sizing the heater mold cavities from 95% to 99.9% of specified extrusion's cross-sectional area eliminates post-thermal swelling. It has been found that a 3% decrease in cavity size or 97% of the desired extruded cross-sectional area to be the preferred reduction. For example, a cylindrical profile extrusion having a desired finished specification diameter of ½" or 0.500", requires the corresponding heater mold cavity to be sized between 0.475" and 0.4995", and preferably 0.485".

After the heating process is complete, the now single flashless extrusion is allowed to cool before removal from the welding system molds. The combination of plunging, clamping, and cooling the molten extrusion material together prevents a flash from forming on the extrusion, and/or forces any excess material to be formed back into the body of the extrusion.

Figure 5A:
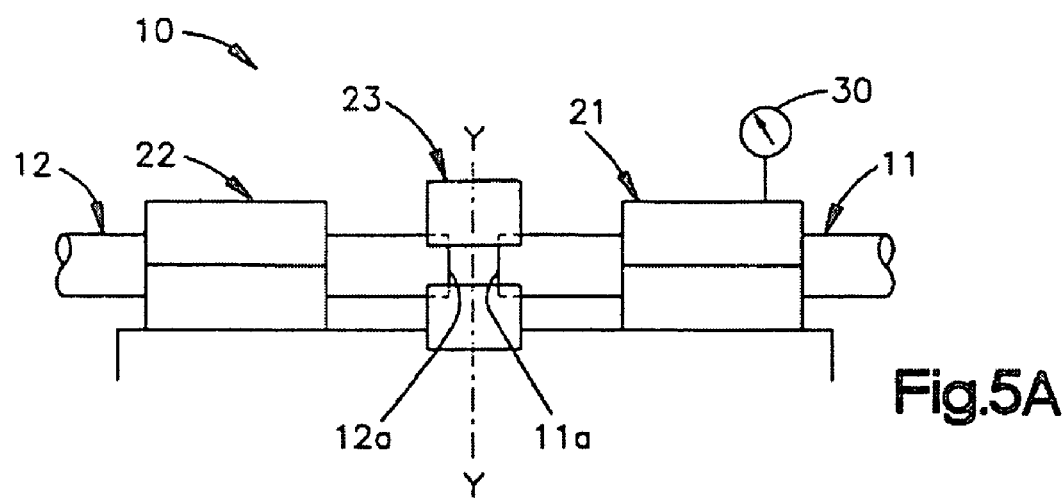
FIG. 5A is an elevation view of the welding system showing another embodiment with a heating mold symmetrically located about the extrusion ends.
Figure 5B:
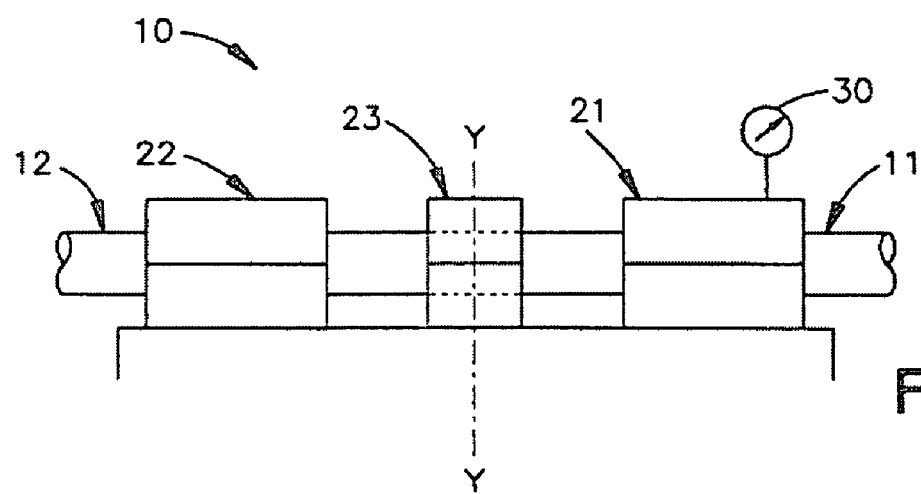
FIG. 5B is an elevation view of the welding system of FIG. 5A showing the extrusion ends encompassed within the heating mold in a welding position.

Encompassing FIGS. 5A and 5B is a separate preferred embodiment, in which a heater mold 23 is symmetrically located between clamping molds 21 and 22. In a first position shown in FIG. 5A, a first 11 and a second 12 extrusion end is loaded within molds 21 and 22, with first joining ends 11a and 12a of the extrusion ends only slightly penetrating heating mold 23. Molds 21 and 22 are then securely clamped on the extrusions, while heating mold 23 remains only in close proximity with the extrusion ends. At such point, heat is applied from the heating mold 23 by hot air, resistive heating, laser heating, gas, or any other conventional method known by those skilled in the art for heating thermal plastic materials.

Once the extrusion joining ends 11a and 12a reach a prescribed melting temperature, the extrusions begin to melt, and clamping molds 21 and 22 are advanced, pushing the respective extrusions together until the prescribed resistive pressure 30 from contact between the extrusion ends is reached. The heating mold 23 then clamps the ends 11 and 12 together until the heating and a subsequent cooling process are complete. The molds are then opened and the continuous flashless extrusion is ready for removal. The combination of heating the mold, advancing the extrusion ends, and clamping to provide continuous pressure on the molten extrusions until the prescribed cooling temperature is reached prevents any flash from forming at the connection of the ends and forces any excess material to be reformed into the body of the extrusion. This welding process enhances both the integrity and seamless appearance of the welded connection.

Referring to FIGS. 6A through 6D is another preferred welding system having a pair of heater bar sleeves 31 and 32. The heater bar sleeves receive and envelop the first 11 and second 12 extrusion ends, as shown through FIGS. 6A and 6B. This is accomplished by advancing the extrusion ends into the sleeves by progressing first and second clamps 21 and 22 to a heating position shown in FIG. 6B.

The heater sleeve can act in place of a heater bar 15 or in conjunction with the heater bar as shown in FIGS. 6A-6D. If the heater sleeves are used in combination with the heater bar 15, the sleeve temperature can be reduced ranging between 150-300 centigrade to melt the extrusion ends along a linear distance enveloped within the sleeves. Absent the heating bar 15, the sleeves may require a temperature in excess of 250 centigrade.

Figure 6A:
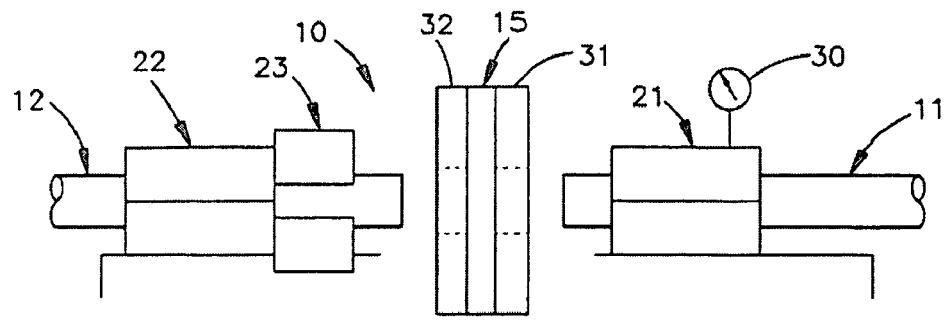
FIG. 6A is an elevation view of the welding system showing an embodiment employing a heating mold and heating sleeves in position for encompassing the extrusion ends.
Figure 6B:
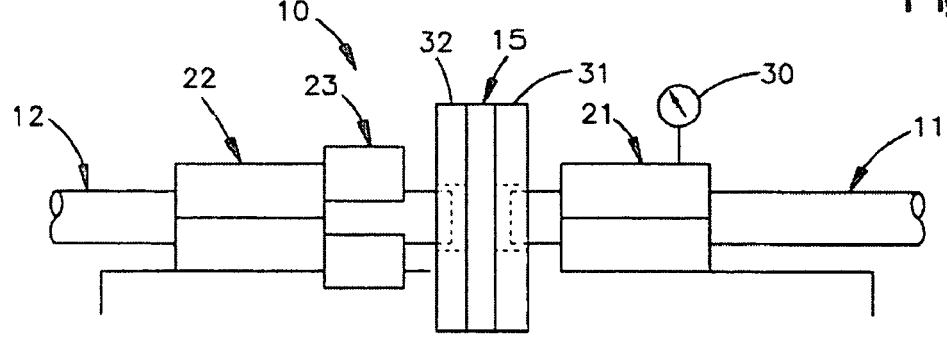
FIG. 6B is an elevation view of the welding system of FIG. 6A with the extrusion ends in a heating position between a pair of heater bar sleeves.
Figure 6C:
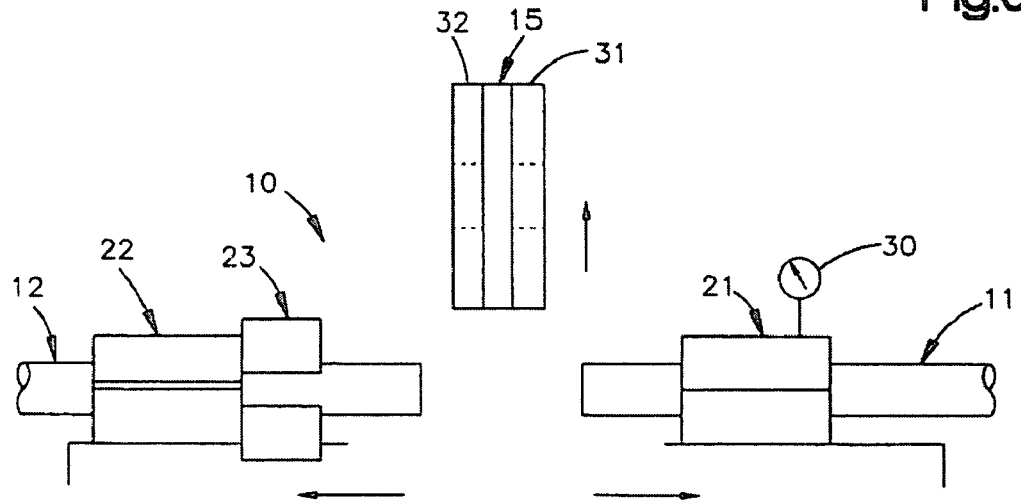
FIG. 6C is an elevation view of the welding system of FIG. 6A where the heating bar and heating bar sleeves are retracted for advancement of the extrusion ends into the heating bar.
Figure 6D:
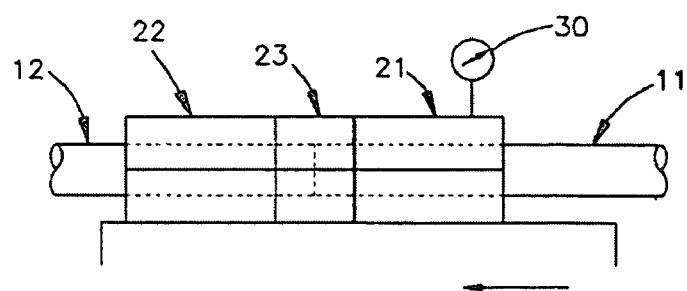
FIG. 6D is an elevation view of the welding system of FIG. 6A showing the extrusions encompassed within the heating mold in a welding position.

After achieving a melting point on the extrusion ends, the heater sleeves 31 and 32 and in this embodiment, heater bar 15 are retracted as shown in FIG. 6C. The extrusion ends are now capable of advancing to a welding position within a heater mold 23, as shown in FIG. 6D and discussed previously. Advancement of first 21 and second 22 molds ceases once a joining pressure 30 is obtained. The extrusion ends are now welded and cooled to a prescribed temperature within the heater mold, after which a single piece gasket or extrudate can be removed.

The heating sleeves aid in elevating the temperature over a larger and more uniform portion of the extrusion ends. As a result, a more uniform weld is formed increasing the overall weld strength. In addition, the combination of heating the mold, advancing the extrusion ends into a heater mold, and clamping to provide continuous pressure on the molten extrusion ends until the prescribed cooling temperature is reached prevents any flash from forming at the connection of the ends and forces any excess material to be reformed into the body of the extrusion. This welding process enhances both the integrity and seamless appearance of the welded connection.

While the present invention has been described with a degree of particularity, it is the intent that the invention includes all modifications and alterations from the disclosed design falling with the spirit or scope of the appended claims.

I claim:

1. An apparatus for forming a flashless weld between extrusion ends comprising:
    a) a first and a second mold for supporting and clamping the ends of at least one extrusion;
    b) a locator for positioning the extrusion ends location with respect to said molds;
    c) a heating element for elevating the temperature of said extrusion ends to a welding condition;
    d) a clamping device for securing the extrusions during said welding operation; and
    e) means for moving the first and second molds into contact with each other over the extrusion ends;
    f) whereby flashless welding occurs by clamping and plunging at least one said extrusion ends from one mold into the other mold until contact is made against said other extrusion end within said other mold.

2. An apparatus for forming a flashless weld between extrusion ends comprising:
    a first and a second mold for supporting and clamping the ends of at least one extrusion;
    a heating element for elevating the temperature of said extrusion ends to a welding condition;
    at least one of said first and second molds being a moveable mold such that after heating said extrusion ends with said heating element, the at least one moveable mold is advanced so that the extrusion ends are in contact and flashless welding occurs by clamping and plunging at one of said extrusion ends into a welding mold until said contact is made against said other extrusion end within said welding mold.

3. The apparatus of claim 2 wherein said welding mold is the other of said first and second molds.

4. The apparatus of claim 2 wherein said welding mold is the other of said first and second molds, the welding mold being a non-moveable welding mold.

5. The apparatus of claim 2 wherein said welding mold is a mold separate from said first mold and said second mold.

6. The apparatus of claim 5 wherein said first and second molds are both moveable molds that clamp and plunge said respective extrusion ends into said welding mold.

7. The apparatus of claim 2 wherein said welding mold is said heating element.

\* \* \* \* \*